US006018856A

United States Patent [19]
Ehrhart

[11] Patent Number: 6,018,856
[45] Date of Patent: Feb. 1, 2000

[54] DEVICE FOR REMOVING AND INSERTING THE RETAINING CLIP OF A COAL MINING DRILL BIT

[76] Inventor: Gary Ehrhart, Rte. 1, Box 145, Wayne City, Ill. 62895

[21] Appl. No.: 09/084,474

[22] Filed: May 26, 1998

[51] Int. Cl.$^7$ .......... B23P 19/02

[52] U.S. Cl. .......... 29/235; 29/243.56; 299/107; 81/486

[58] Field of Search .......... 81/486; 299/107; 29/235, 243.56

[56] References Cited

U.S. PATENT DOCUMENTS

| | | | |
|---|---|---|---|
| 2,359,237 | 9/1944 | Morehouse | 81/486 |
| 2,409,784 | 10/1946 | Morehouse | 81/486 |
| 3,160,890 | 12/1964 | Lefebvre | 29/243.56 X |
| 3,397,012 | 8/1968 | Krekeler | 299/107 X |
| 3,965,776 | 6/1976 | Wolstenholme et al. | 81/486 |
| 3,971,269 | 7/1976 | Martens | 29/270 |
| 4,246,903 | 1/1981 | Larkin | 606/143 |
| 4,637,395 | 1/1987 | Caspar et al. | 606/143 |
| 4,785,694 | 11/1988 | Burmester | 81/485 |
| 4,952,001 | 8/1990 | Emmerich | 299/107 |
| 5,557,832 | 9/1996 | Brook | 29/243.56 |

*Primary Examiner*—Eileen Dunn Lillis
*Assistant Examiner*—Sunil Singh
*Attorney, Agent, or Firm*—Peter R. Bahn

[57] ABSTRACT

A device for removing and inserting drill bit retaining clips. The device having a casing rigidly connected to a base plate, the casing containing a piston, one end of the piston contacting a spring against the base plate, the other end of the piston having a nib, the piston also includes a handle, wherein the piston may be pressed toward the base plate allowing the nip to grip a retaining clip against the casing, so that the retaining clip can be removed or inserted while being held.

6 Claims, 4 Drawing Sheets

DEVICE FOR REMOVING AND INSERTING THE RETAINING CLIP OF A COAL MINING DRILL BIT

DESCRIPTION OF THE INVENTION

This invention relates to the field of mechanical arts. More specific ally, it relates to the field of tools used in the coal mining industry. Finally, this invention can best be described as a tool for removing and inserting the retaining clips that hold coal mining drill bits in the holders of rotating mining drums.

A typical drill bit is a short lance-shaped piece of steel 16 cm long which fits into an irregular shaped metal holder. Several of such holders are welded to a rotating coal mining drum which moves the drill bits around in a circular motion against the surface of a coal seam to knock chunks of coal out of the seam during a mining operation.

The drill bits are freely rotatable within the drill bit holders but prevented from coming out of the holders by omega-shaped metal retaining clips. When a bit finally becomes worn out from too much use and must be replaced. The retaining clip must be removed, the old bit discarded, a new bit put in the holder, and the retaining clip inserted onto the new drill bit.

A problem occurs because the retaining clip is too strong to be removed with a person's fingers and it is not easy to reach inside the drill bit holder. So users generally try to pry off the retaining clip with a screw driver but this usually does not work very well and the screw driver usually has to be of just the right size to work.

In the insertion of the retaining clip on a newly installed drill bit, the problem is even worse. It is extremely awkward to hold onto the retaining clip at just the right orientation inside the opening of the bit holder and to apply enough force to get the retaining clip to snap onto the drill bit. To do this people often try pliers, screw drivers, and hammers, but often get their finger nails chewed up in the process.

Consequently, it is an object of the present invention to allow a user of the device to easily and conveniently remove a retaining clip from a drill bit. It is another object of the present invention to allow a retaining clip to be inserted onto a drill bit.

The nature of the present invention is shown in the accompanying drawings.

Figure 5:
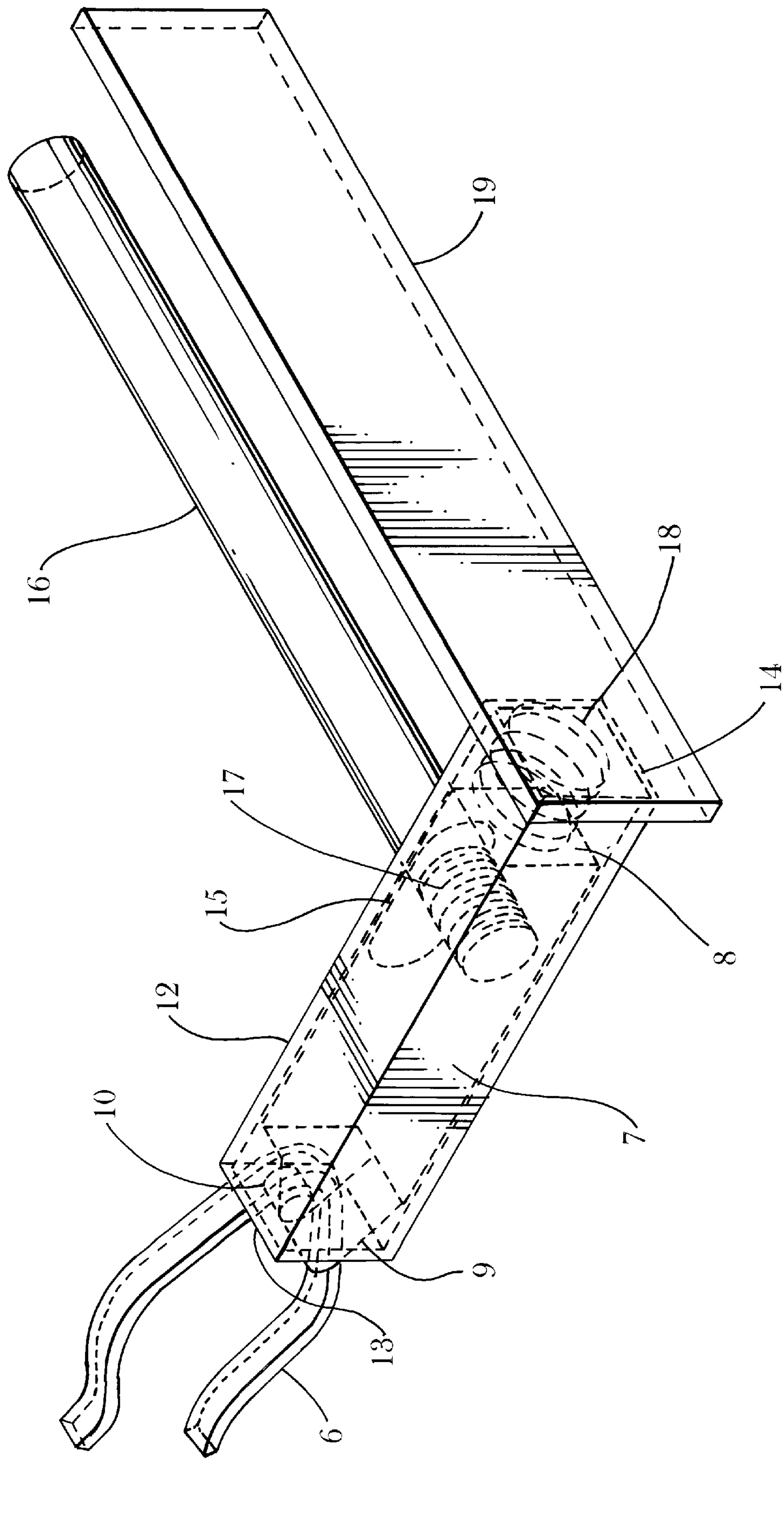

Finally,

FIG. 5 shows the present invention with the retaining clip held in it as it would be when the device is used to either remove or insert the retaining clip of a drill bit.

Although all parts shown in these drawings are made of metal, they are depicted in the drawings as if they were transparent for the sake of clarity.

Figure 1:
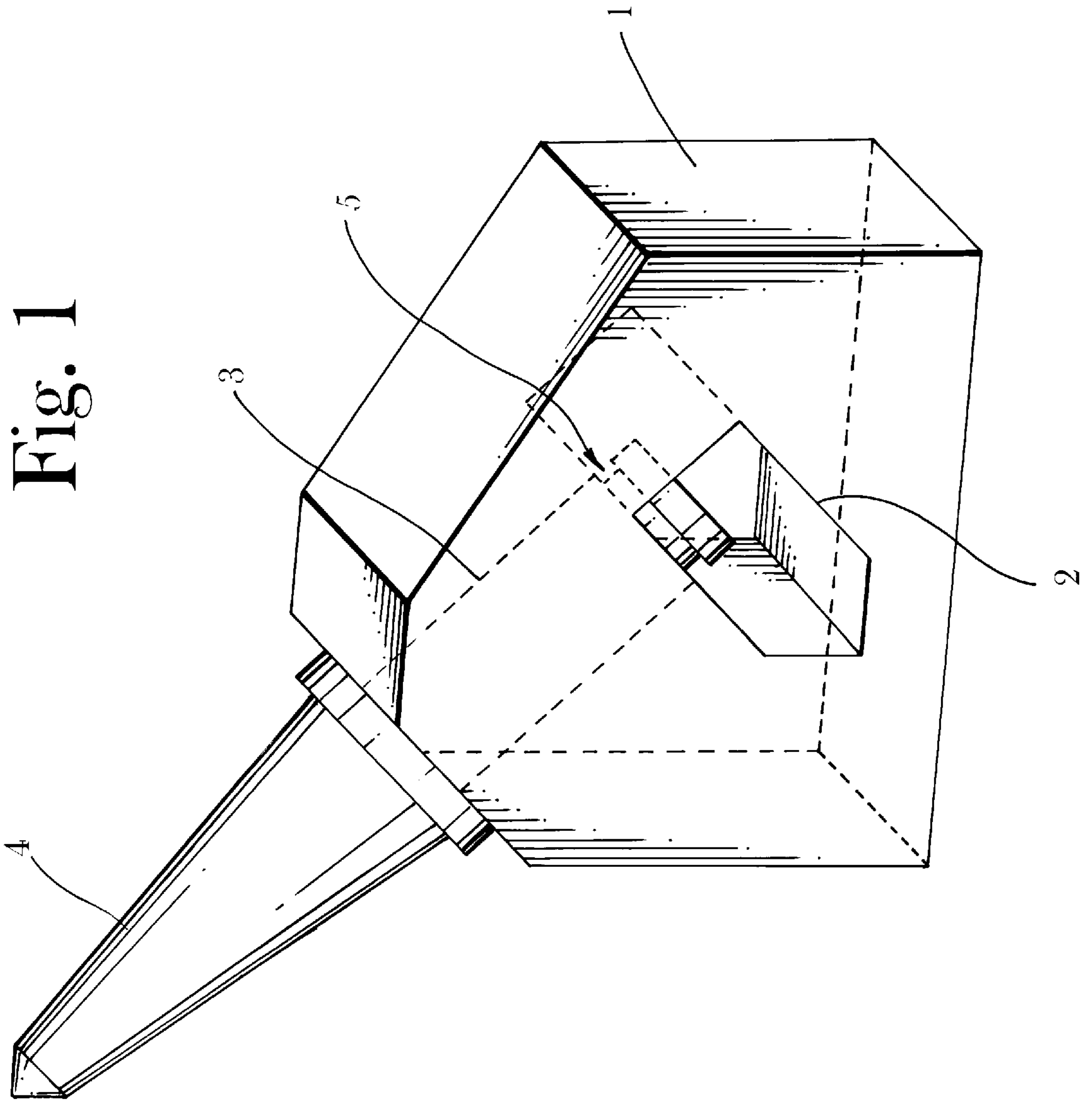
FIG. 1 shows a typical drill bit holder with a typical drill bit installed in the holder.

More particularly, in FIG. 1 is shown a drill bit holder 1 which has an interior space 2 running through it. The drill bit holder has a cylindrical hole 3 also. The drill bit 4 sits in the hole 3 and protrudes all the way through the hole 3. On the portion of the drill bit which protrudes through the hole 3 there is an annular groove 5 in which groove is place a retaining clip to keep the drill bit 4 from coming out of the hole 3 during coal mining operations.

Figures 2, 3:
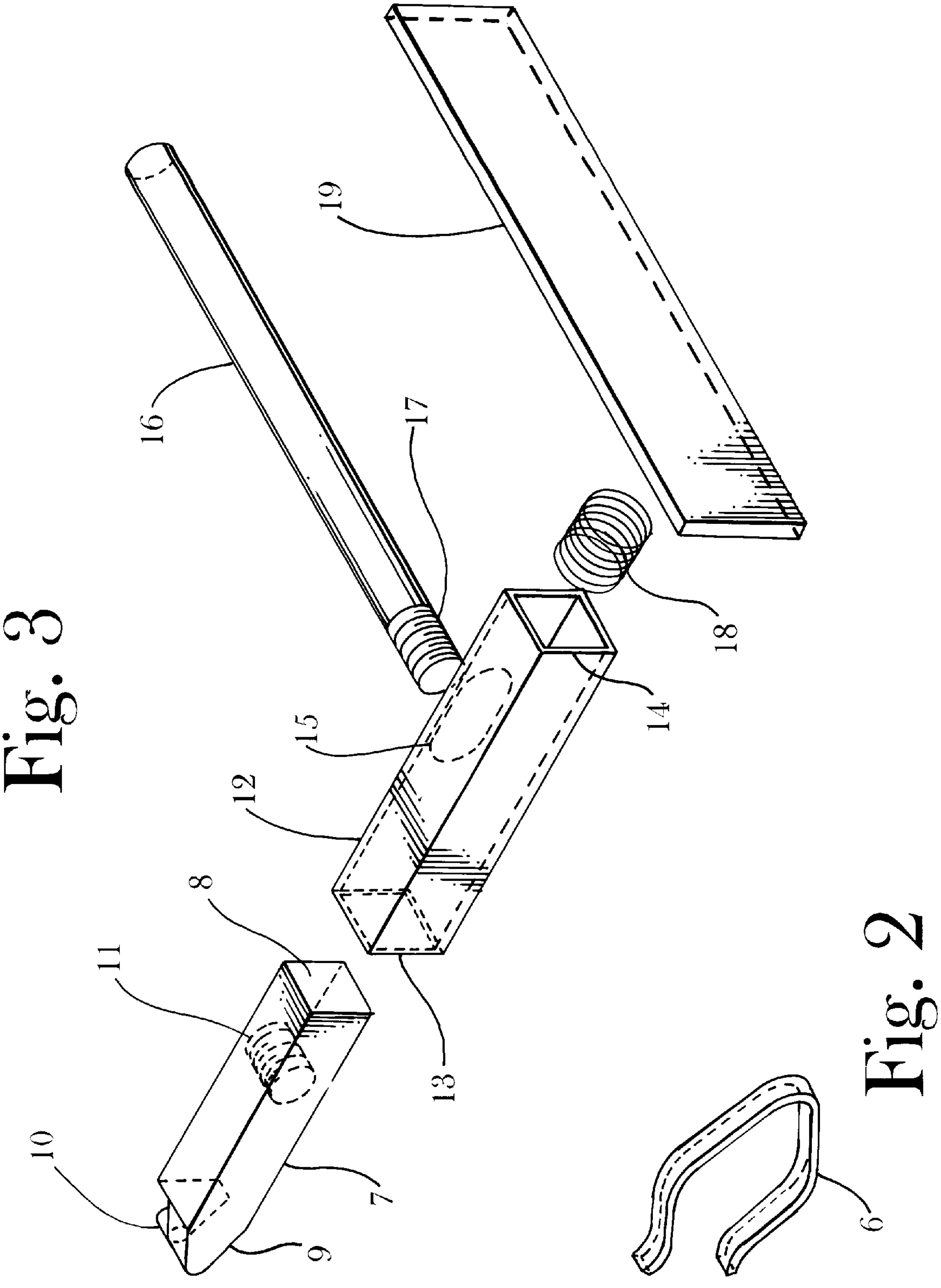
FIG. 2 shows a standard drill bit retaining clip.
FIG. 3 shows an exploded view of the five different parts which are assembled to make the present invention.

In FIG. 2 is shown the retaining clip 6 which fits into the annular groove 5 of the drill bit 4 shown in the previous drawing. The retaining clip 6 is roughly shaped like the Greek letter omega but with the top part of the letter omega pulled up a bit.

In FIG. 3 is shown an exploded view of the five different parts which are assembled to make the present invention, a device for removing and inserting the retaining clip from a drill bit. The first part of the device shown is a solid rectangular piston 7 which has a triangular prism shaped top 9 from which extends a cylindrical nib 10. The piston 7 also has a threaded screw hole 11 extending part way into it and the piston 7 also has a flat square surface 8. The present device possesses a hollow rectangular casing 12 with an upper lip 13 and a bottom lip 14. The hollow casing 12 also possesses an oblong hole 15. The present invention also has a cylindrical handle 16 with a screw threaded end 17. The device also has a spring 18. Finally, the invention also has a rectangular base plate 19.

Figure 4:
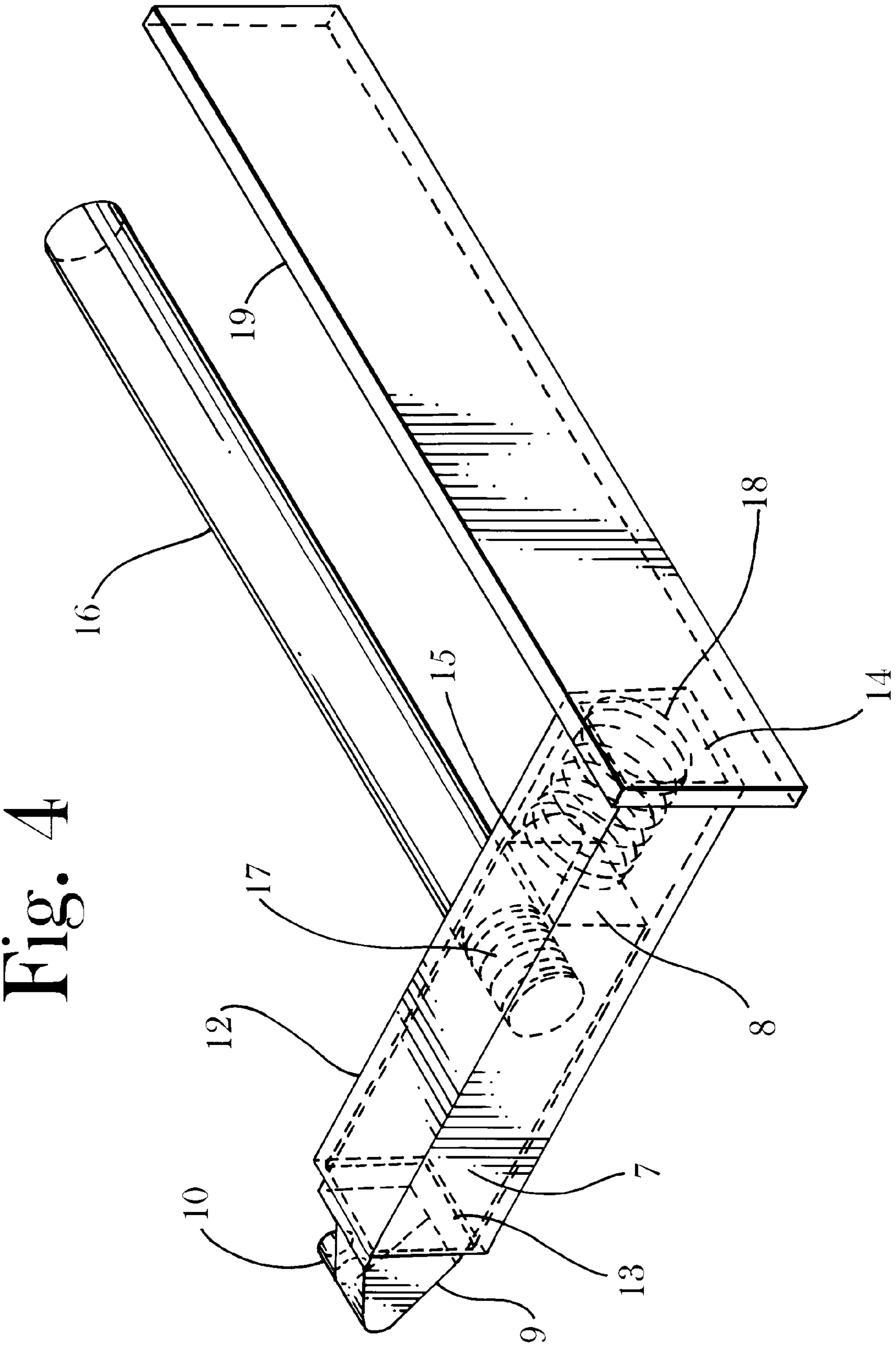
FIG. 4 shows the assembled invention itself.

The way in which the parts of the invention are put together to form a functional device is shown in FIG. 4. The hollow rectangular casing 12 is welded to the rectangular base plate 19 where the bottom lip 14 of the casing meets the flat surface of the base plate 19 at one end of the base plate. The spring 18 is then dropped into the hollow casing 12 so that the bottom surface of the spring rests against the top surface of the base plate. Then the rectangular piston 7 is dropped into the hollow casing 12 so that the bottom surface 8 of the piston rests on the top surface of the spring 18. The cylindrical handle 16 is then attached to the piston 7 by screwing the threaded end 17 of the handle through the oblong hole 15 into the threaded hole 11 of the piston 17. The assembled device then looks as it is shown in the drawing, ready for use.

In FIG. 5 is shown the device as it is used to remove or insert a retaining clip. The nib 10 of the piston 7 has been placed on the inside of the top portion of the omega-shaped retaining clip 6, while the user has squeezed the handle 16 toward the base plate 19, thus securing the outer edges of the retaining clip 6 against the upper end 13 of the casing 12. With the retaining clip 6 secured to the device in this position as shown in FIG. 5, the retaining clip can be easily removed from or inserted onto the annular groove of a drill bit. When the user relaxes his grip from squeezing the handle 16 toward the base plate 19, the spring 18 then pushes the piston 7 upward in the casing 12 so that the nib 10 does not press the edges of the retaining clip 6 against the upper edge 13 of the casing 12 so that the grip of the device on the retaining clip is released.

Typical dimensions involved in the best mode practice of this invention are as follows (referring to FIGS. 1–5): A standard drill bit 4 has a length of 16.0 cm. The hole 3 in the drill bit holder 1 through which the drill bit fits has a diameter of 3.0 cm. The retaining clip 6 is made from a steel strip with a cross section of 0.4 cm by 0.2 cm bent roughly in the shape of the Greek letter omega.

On the device itself, the base plate 19 is 12.5 cm long, 2.5 cm wide, and 0.3 cm thick. The casing 12, which is welded to the base plate, is 7.5 cm long, measures 1.5 cm on each side and is made of metal which is 0.1 cm thick. The spring 18 is made of coiled steel with a 0.1 cm cross section diameter. The outer diameter of the coil itself is 1.2 cm.

The rectangular piston 7 has a total length of 6.3 cm from nib 10 to the bottom surface 8. The piston 7 measures 1.3 cm on each side. The threaded screw hole 11 has a diameter of 0.9 cm. The cylindrical nib 10 is 0.5 cm long and possesses a diameter of 0.5 cm.

The handle 16 is 13.0 cm long and has a diameter of 0.9 cm. The oblong hole 15 in the casing 12 through which the handle 16 fits has a length of 2.2 cm and a width of 1.0 cm.

All parts of this invention are preferably made out of steel. It should also be apparent that the above dimensions are given by way of the best mode example contemplated by the inventor and that the said dimensions may be varied without departing from the scope of this invention as claimed by the Inventor.

What is claimed is:

1. A device for removing and inserting drill bit retaining clips comprising: a casing rigidly connected to a base plate, the casing containing a piston, one end of said piston contacting a spring against the base plate, the other end of the piston possessing a nib, the piston also possessing a handle by which means the piston may be pressed toward the base plate whereupon the nib grips a retaining clip against an exposed edge of the casing, so that the retaining clip can be removed or inserted while so being held.

2. The device as described in claim 1 wherein all parts of the device are made of steel.

3. A device for removing and inserting drill bit retaining clips comprising: a rectangular casing rigidly connected to a rectangular base plate, the casing containing a rectangular piston, one end of piston contacting a spring against the base plate, the other end of the piston possessing a nib, the piston also possessing a cylindrical handle by which means the piston may be pressed toward the base plate whereupon the nib grips a retaining clip against an exposed edge of the casing, so that the retaining clip can be removed or inserted while so being held.

4. The device as described in the claim 3 wherein all parts of the device are made of steel.

5. A device for removing and inserting drill bit retaining clips comprising: a rectangular casing rigidly connected to a rectangular base plate, the casing containing a rectangular piston, one end of piston contacting a spring against the base plate, the other end of the piston possessing a nib, the piston also possessing a cylindrical handle screwed into a hole in the piston but said handle sticks out of an oblong hole in the casing by which means the piston may be pressed toward the base plate whereupon the nib grips a retaining clip against an exposed edge of the casing, so that the retaining clip can be removed or inserted while so being held.

6. The device as described in claim 5 wherein all parts of the device are made of steel.

* * * * *